May 19, 1925.

C. P. ASTROM

DUMPING CAR

Filed May 29, 1924    2 Sheets-Sheet 1

1,538,499

INVENTOR
Carl P. Astrom,
BY
ATTORNEY

May 19, 1925.
C. P. ASTROM
DUMPING CAR
Filed May 29, 1924
1,538,499
2 Sheets-Sheet 2
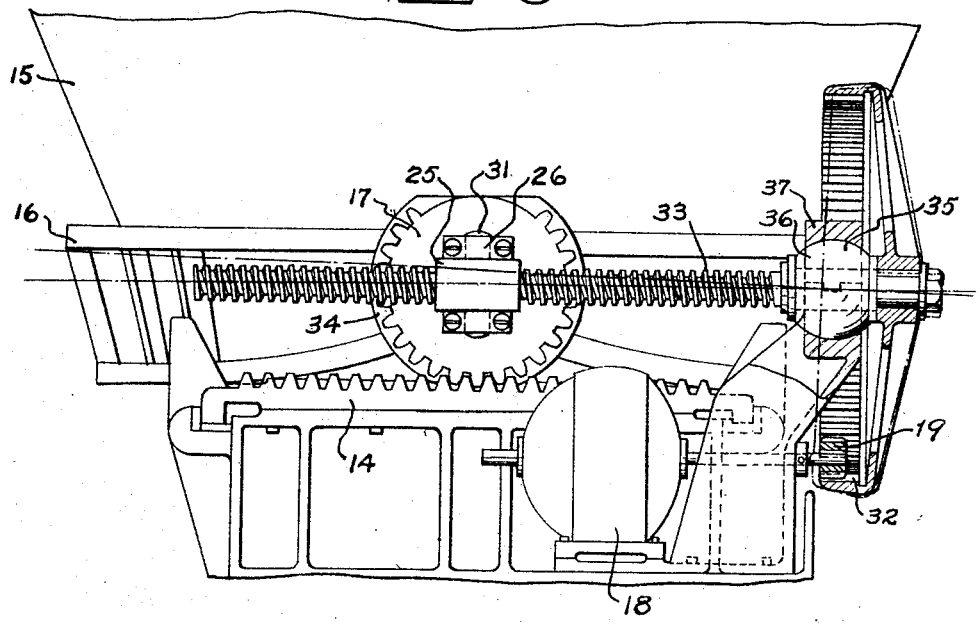
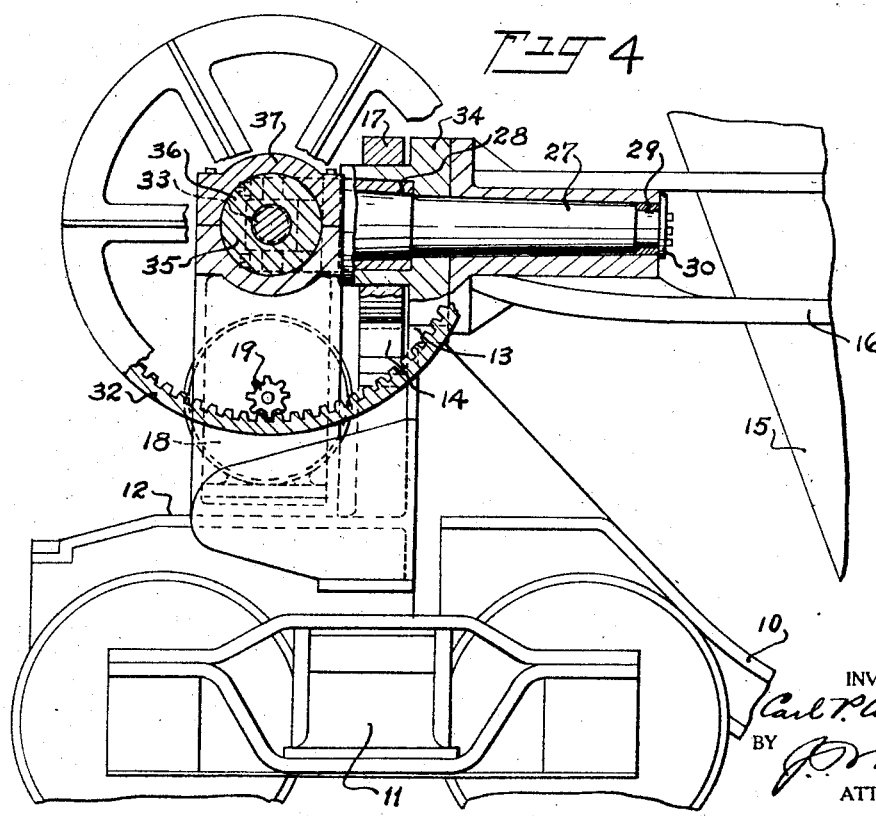
INVENTOR
Carl P. Astrom
BY
ATTORNEY Patented May 19, 1925.

1,538,499

UNITED STATES PATENT OFFICE.

CARL P. ASTROM, OF EAST ORANGE, NEW JERSEY, ASSIGNOR TO M. H. TREADWELL COMPANY, A CORPORATION OF NEW YORK.

DUMPING CAR.

Application filed May 29, 1924. Serial No. 716,551.

*To all whom it may concern:*

Be it known that I, CARL P. ASTROM, a citizen of the United States, and resident of East Orange, in the county of Essex and State of New Jersey, have invented certain new and useful Improvements in Dumping Cars, of which the following is a specification.

This invention relates to tilting and laterally moving dumping cars, and has for its object to enable such a car body to be operated by a rotary motor geared thereto by reduction gearing without imposing undue strains upon the mechanism in case cinders or other obstructions may clog a rack or because of change in the angular relation between the car body tilting axis and the driving mechanism.

A usual form of tilting and laterally moving dumping car is mounted to tilt and roll on trunnions along a track; one trunnion is driven by reduction gearing from a rotary motor. There is considerable danger of dirt, cinders, etc. getting on the track or into the teeth of the rack paralleling the track to prevent slipping of a trunnion. Should such dirt clog the track, or rack teeth, it may cause one of the trunnions to be raised and have its axis shifted relative to the driving mechanism with danger of rupture of some part of the driving mechanism.

By this invention, a flexible driving coupling between the driving motor and the driven trunnion is provided so as to permit skewing of the car body without preventing it from being operated. This invention is adapted for cars which dump to only one side, or the end, as well as to those which dump on both sides.

Figure 1:
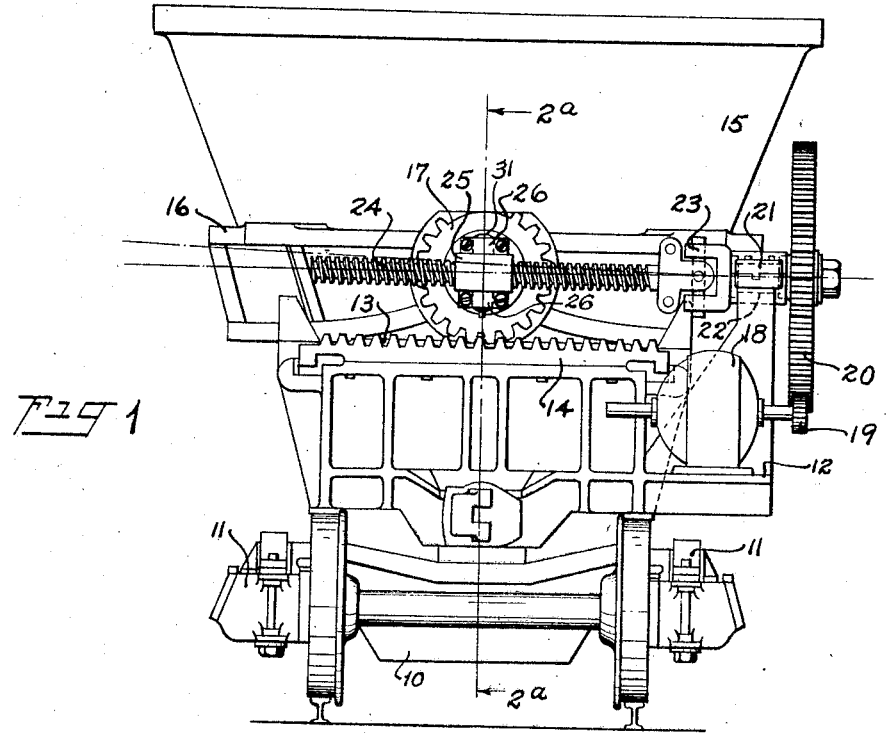
Figure 2:
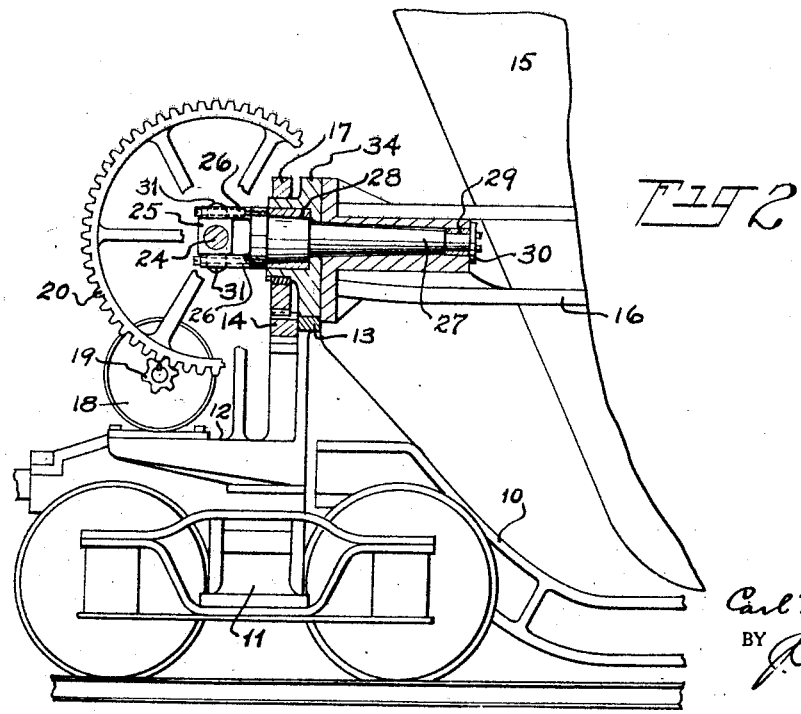

In the accompanying drawings, Fig. 1 is an end view of a dump car body embodying this invention, Fig. 2 is a side view partly in section on the line 2ª—2ª of Fig. 1, Fig. 3 is an end view of a modified construction with parts broken away, Fig. 4 is a side view partly in section of the modification shown in Fig. 3.

Referring to the drawings, the numeral 10 indicates the under frame supported at each end on the usual trucks 11, provided with customary coupling equipment and having on top a platform 12 on which are mounted supports for the track rails 13 and the rack 14. The dumping car body 15 is mounted in a suitable yoke 16 provided at the ends with trunnions 34 adapted to roll along the track rails 13. Pinions 17 mesh with the teeth of the rack 14 to prevent slipping of the trunnions on the rails. On one of the platforms 12 is provided the electric motor 18 driving the shaft 22 through gears 19 and 20. The shaft 22 is provided with a stationary bearing 21 supported from the platform 12. Also on shaft 22 is the universal coupling 23 actuating the threaded driving member 24 which parallels the track but is unsupported at the other end. The driving member 24 is provided with a low pitch screw so that the car will never actuate the motor. On the driving member is a nut 25 secured within the bifurcated end portion 26 of the member 27 rotatably secured within the trunnion 34. The member 27 is secured in position by a bolted flange 30, or other fastening means, and has two bearing surfaces 28 and 29 inside the trunnion. If desired, the securing means for the flange 30 may be made to break and allow the member 27 to come out of the trunnion in case the car body rolls off the opposite rail. Projections 31 on the nut retain the same within the bifurcated end portion 26 of the member 27. One or both prongs of the bifurcated end may be removably secured by means of bolts or otherwise for the purpose of inserting the nut and its projections. The stationary bearing 21 is adapted to take up axial thrusts in either direction incident to tilting the dumping car body.

In Fig. 3 is shown a modified construction where the motor 18 provided with a pinion 19 engages teeth inside the large gear 32 mounted on an extension of the threaded driving member 33. The nut 25 cooperates with the driving member 33 in substantially the same manner as in Fig. 1. Instead of the universal coupling 23 a spherical bearing 35 is provided on member 33, said member rotating within the ball 36 and the ball being capable of moving within its housing 37 with any movement of member 33 out of its usual alinement. Means may be provided to take up any axial thrust in member 33 during dumping movement without transmitting the same to the spherical bearing or if desired this bearing itself may be so designed.

A possible cause for the trunnion axis having its normal direction relative to the driving member 24 and the track 13 changed is the possibility of dirt or slag collecting on the track 13 or rack 14 with the result that the teeth of the rack and pinion become disengaged and there exists the possibility of one trunnion being moved ahead or behind the other and the teeth of the rack being re-engaged with the trunnion axis out of its normal position relative to the track and driving member. For the purpose of preventing breakage and undue strains in case the angle of the trunnion axis is changed, with regard to the track and driving member, the flexible couplings illustrated in Figs. 1 and 3 are placed between the motor and the driven trunnion so that the driving member 24 or 33 may be moved out of position without transferring any strains to the driving motor. In Fig. 1 the shaft 22 remains in fixed alinement at all times and does not change with any movement of the driving member 24. In Fig. 3 the corresponding shaft on which the driving gear 32 is mounted, is a projection of the driving member 33 and this shaft together with the gear 32 may oscillate when the driving member 33 is moved out of alinement. The spherical bearing 35 in Fig. 3 makes this possible. Any axial thrusts upon the driving member 33 are taken up by the spherical bearing. The teeth of the pinion 19 and gear 32 are not ordinarily subjected to any pressure but in case the gear 32 oscillates a large amount the teeth of the pinion 19 and gear 32 may be elongated to allow the relative movement to take place between these two members. The dotted line in Fig. 1 shows how the axis of the driving member may be raised in case slag or other dirt causes the trunnion axis to be raised. The dotted lines for the driving member and gear in Fig. 3 also indicate the extent of movement which may be required if the trunnion is raised to clear a rack tooth. In Fig. 1 the movement occurs about the universal joint while in Fig. 3 the movement is about the center of the spherical bearing.

Among the advantages of this invention may be mentioned the adaptability of the trunnion axis to become misplaced without imparting any dangerous strains to any part of the driving mechanism. The universal coupling 23, or its equivalent the spherical bearing 32, permits movement of the driving member 24 or 33 in different planes such as would be necessary in case the driven trunnion were raised and moved ahead or behind the other. The particular embodiment illustrated is well adapted for use with a rotatable motor.

I claim:

1. In a tilting and laterally moving dumping car, a car body having tilting and rolling supporting trunnions, a rotary motor and driving mechanism connected to one trunnion, said mechanism including flexible means permitting shifting of the trunnion axis relative to the motor axis without straining the driving mechanism or motor.

2. In a tilting and laterally moving dumping car, a car body having tilting and rolling supporting trunnions, driving means for one trunnion, a rotatable member paralleling the path of movement of said trunnion and connecting said trunnion with said driving means, and a pivotal mechanism for said member permitting a relative shifting between the trunnion axis and that of the rotatable member.

3. In a tilting and laterally moving dumping car, a car body having tilting and rolling supporting trunnions, a rotary motor for driving at least one trunnion, a rotatable member extending along the path of movement of said trunnion and connecting said motor and trunnion, and pivotal mechanism between said motor and trunnion permitting movement of said rotatable member in two planes.

4. The combination with a dumping car, of a track, trunnions supporting said car and mounted to roll on said track, a driving means for tilting said car, a rotatable member paralleling said track, and connecting said means with at least one trunnion, and a universal joint between said member and said means.

5. The combination with a dumping car, of a track, trunnions supporting said car and mounted to roll on said track, a rotatable driving means for tilting said car, and yieldable mechanism between said means and said trunnions permitting the trunnion axis to be shifted relative to the track without disconnecting said driving means from said car.

6. The combination with a dumping car, of a track, trunnions supporting said car and mounted to roll on said track, a rotatable driving means for tilting said car, a threaded shaft paralleling said track and driven by said means, a nut engaging said shaft and rotatably connected to a trunnion, and mechanism between said shaft and said means for permitting the trunnion axis to be angularly displaced without disconnecting said driving means.

7. The combination with a dumping car, of a track, trunnions supporting said car and mounted to roll on said track, a rotatable driving means for tilting said car, a threaded shaft paralleling said track and driven by said means, a nut engaging said shaft, a bifurcated pin rotatably mounted within a trunnion and receiving said nut within its bifurcated portion, and a pivotal mechanism between said shaft and means for permitting one trunnion to be raised and moved ahead of the other without disconnecting said driving means.

8. The combination with a dumping car, of a track, trunnions supporting said car and mounted to roll on said track, a rotatable driving means for tilting said car, a rotatable member paralleling said track and connecting said means with at least one trunnion, and a spherical bearing between said member and said means.

9. The combination with a dumping car, of a track, trunnions supporting said car and mounted to roll on said track, a rotatable driving means for tilting said car, a threaded shaft paralleling said track and driven by said means, a nut engaging said shaft, a bifurcated pin rotatably mounted within a trunnion and receiving said nut within its bifurcated portion, a connecting member for said nut and bifurcated portion of the pin with the axis of said connecting member intersecting the axis of said pin and rotatable member, and a pivotal mechanism between said shaft and means for permitting the trunnion axis to be angularly shifted without disconnecting said driving means.

10. The combination with a dumping car, of an under frame, a track on said under frame, trunnions supporting said car to roll on said track, a threaded member extending across said under frame adjacent a trunnion, a nut engaging said member and rotatably connected to said trunnion, an electric motor secured to said under frame below said threaded member, gearing for driving said member from said motor, and flexible means between said motor and trunnion enabling the angle between the horizontal projection of the trunnion axis and threaded member axis to be changed without disconnecting the motor, or the imposition of substantial strains.

11. The combination with a dumping car, of an under frame, a track on said under frame, trunnions supporting said car to roll on said track, a threaded member intersecting said trunnion axis and normal thereto, a nut engaging said member and rotatably connected with said trunnion, a rotary motor secured to said under frame below the threaded member, gearing for driving said member from said motor, and flexible coupling means between said motor and trunnion enabling the angle between the trunnion axis and threaded member to be changed without disconnecting said motor, or the imposition of substantial strains.

Signed at New York, in the county of New York and State of New York this 28th day of May A. D. 1924.

CARL P. ASTROM.